(12) United States Patent
Toub et al.

(10) Patent No.: US 9,141,422 B2
(45) Date of Patent: Sep. 22, 2015

(54) PLUG-IN TASK SCHEDULER

(75) Inventors: Stephen H. Toub, Seattle, WA (US); Huseyin S. Yildiz, Kenmore, WA (US); Joseph E. Hoag, Bothell, WA (US); John J. Duffy, Renton, WA (US); Danny Shih, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 919 days.

(21) Appl. No.: 12/782,684

(22) Filed: May 18, 2010

(65) Prior Publication Data

US 2011/0289503 A1 Nov. 24, 2011

(51) Int. Cl.
G06F 9/46 (2006.01)
G06F 9/48 (2006.01)

(52) U.S. Cl.
CPC .................................. *G06F 9/4843* (2013.01)

(58) Field of Classification Search
None
See application file for complete search history.

(56) References Cited

U.S. PATENT DOCUMENTS

| | | | |
|---|---|---|---|
| 5,099,418 A * | 3/1992 | Pian et al. | 718/102 |
| 5,826,081 A | 10/1998 | Zolnowsky | |
| 7,162,664 B2 | 1/2007 | Haselden et al. | |
| 7,222,218 B2 * | 5/2007 | Dutt et al. | 711/125 |
| 7,296,271 B1 * | 11/2007 | Chalmer et al. | 718/108 |
| 2005/0223199 A1 | 10/2005 | Grochowski et al. | |
| 2006/0253853 A1 | 11/2006 | Jiang | |
| 2007/0028242 A1 * | 2/2007 | Martin et al. | 718/102 |
| 2007/0256075 A1 * | 11/2007 | Denis | 718/102 |
| 2008/0028405 A1 * | 1/2008 | Martin et al. | 718/102 |
| 2008/0276262 A1 | 11/2008 | Munshi et al. | |
| 2009/0217290 A1 * | 8/2009 | Nayberg | 718/108 |

OTHER PUBLICATIONS

"How to get all tasks?", "Parallel Extensions to the .NET Framework", Apr. 16-20, 2010, pp. 1-4.*
Ding, et al., "Customized Plug-In Modules in Metascheduler CSF4 for Life Sciences Applications", Retrieved at <<http://www.springerlink.com/index/04J30319P8642M10.pdf >>, New Generation Computing, vol. 25, No. 4, Apr. 7, 2007, pp. 1-24.
Qin, et al., "Dynamic, Reliability-Driven Scheduling of Parallel Real-Time Job in Heterogeneous System", Retrieved at <<http://citeseerx.ist.psu.edu/viewdoc/download?doi=10.1.1.21.6487&rep=rep1&type=pdf >>, Proceedings of the 2001 International Conference on Parallel Processing, ICPP 2002, Sep. 3-7, 2001, pp. 10.
Lindberg, et al., "Plug-In Based Aperiodic Task Handling for Diverse Real-Time Systems", Retrieved at <<http://www.artes.uu.se/events/gsconf99/lindberg.pdf>>, 11th Euromicro Workshop on Real-Time Systems, Jun. 1999, pp. 1-4.

* cited by examiner

*Primary Examiner* — Gregory A Kessler
(74) *Attorney, Agent, or Firm* — Kevin Sullivan; Aaron Hoff; Micky Minhas (57) ABSTRACT

A parallel execution runtime allows tasks to be executed concurrently in a runtime environment. The parallel execution runtime delegates the implementation of task queuing, dispatch, and thread management to one or more plug-in schedulers in a runtime environment of a computer system. The plug-in schedulers may be provided by user code or other suitable sources and include interfaces that operate in conjunction with the runtime. The runtime tracks the schedulers and maintains control of all aspects of the execution of tasks from user code including task initialization, task status, task waiting, task cancellation, task continuations, and task exception handling.

19 Claims, 6 Drawing Sheets

PLUG-IN TASK SCHEDULER

BACKGROUND

Computer systems often have the ability to execute different parts of the same process, e.g., different tasks, concurrently. A scheduler or other programming entity in the computer system may manage the concurrent execution of the tasks of a process. As the use of the concurrent execution ability by processes increases, the scheduling demands of different processes may become markedly different such that a scheduler may not execute all processes as efficiently as possible. While some schedulers may have parameters or policies that may be configured by a process, the parameters and policies may not be sufficient to optimize the scheduler for execution of a particular process.

A scheduler often forms an integral portion of a runtime environment of the computer system. As a result, the ability of runtime developers to implement increased flexibility in the scheduler may be limited by the overall complexity of the runtime environment. This difficulty reduces the likelihood that improvements to a scheduler can keep pace with increasing process demands for flexibility in concurrent execution.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A parallel execution runtime allows tasks to be executed concurrently in a runtime environment. The parallel execution runtime delegates the implementation of task queuing, dispatch, and thread management to one or more plug-in schedulers in a runtime environment of a computer system. The plug-in schedulers may be provided by user code or other suitable sources and include interfaces that operate in conjunction with the runtime. The runtime tracks the schedulers and maintains control of all aspects of the execution of tasks from user code including task initialization, task status, task waiting, task cancellation, task continuations, and task exception handling. The runtime also allows the schedulers to determine whether tasks may be executed inline on threads that wait on the tasks. In addition, the runtime and schedulers expose interfaces to a debugger to allow the debugger to access information from the schedulers during execution.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
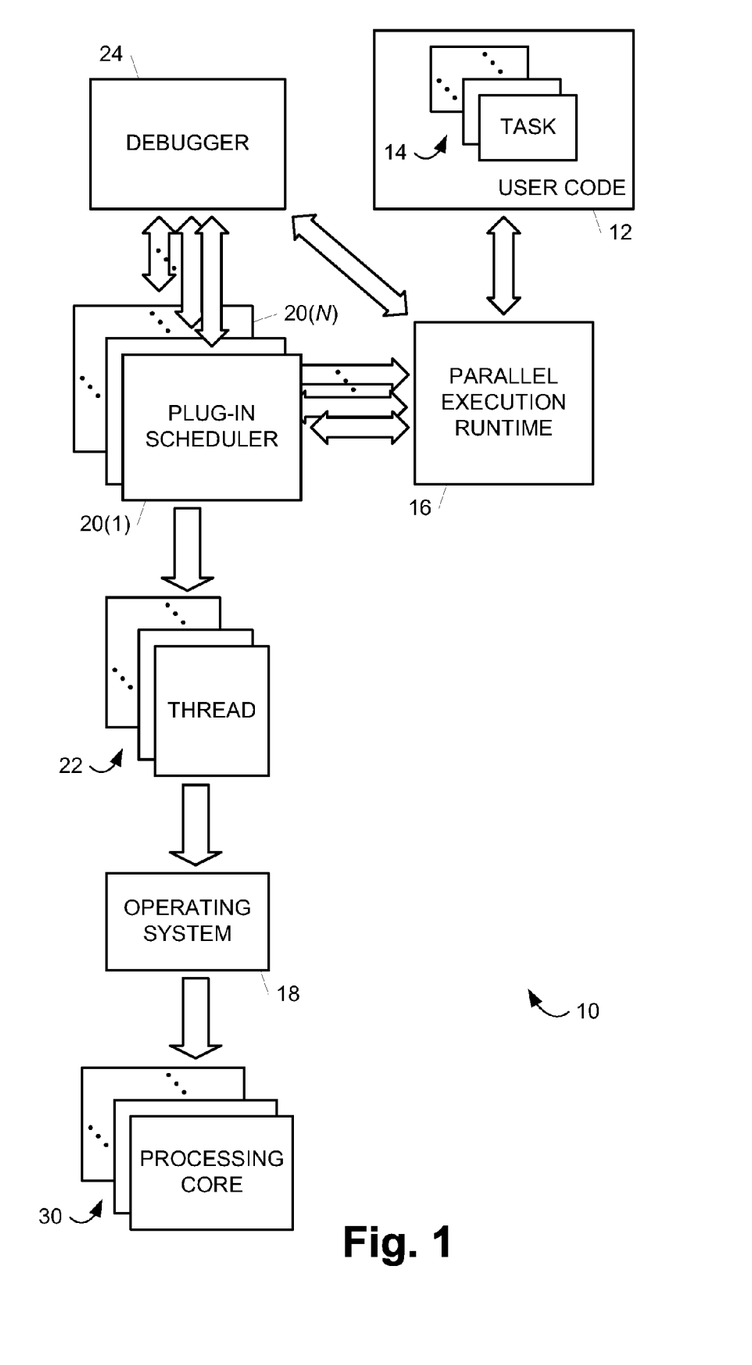
FIG. 1 is a block diagram illustrating an embodiment of a runtime environment with a parallel execution runtime and a set of plug-in schedulers.

FIG. 1 is a block diagram illustrating an embodiment of a runtime environment with a parallel execution runtime 16 and a set of one or more plug-in schedulers 20(1)-20(N), where N is an integer that is greater than or equal to one and denotes the Nth scheduler 20(N).

Runtime environment 10 represents a runtime mode of operation in a computer system, such as a computer system 100 shown in FIG. 8 and described in additional detail below, where the computer system is executing instructions on a set of one or more processing cores 30 of the computer system. Runtime environment 10 includes invoked user code 12, parallel execution runtime 16 (hereafter referred to as runtime 16), an operating system (OS) 18, schedulers 20(1)-20(N), a set of one or more threads of execution 22, and a debugger 24. Runtime environment 10 allows tasks from a set of tasks 14 of user code 12 to be executed, along with tasks from any other processes that co-exist with user code 12, using runtime 16, OS 18, schedulers 20(1)-20(N), threads 22, and processing cores 30.

User code 12 includes a sequence of instructions where at least a portion of the sequence is sub-divided into tasks 14. User code 12 causes tasks 14 to be scheduled for execution on processing cores 30 by one or more of schedulers 20(1)-20(N) that are designated by user code 12. User code 12 may provide one or more of the schedulers 20, invoke one or more of the schedulers 20 from known or identified locations in the computer system, and/or access one or more previously invoked schedulers 20 in the computer system.

Each task 14 includes a sequence of instructions that perform a unit of work when executed by a processing core 30. Tasks 14 are coded such that one or more tasks 14 may be scheduled for concurrent execution by processing cores 30 and/or executed concurrently by processing cores 30. Tasks 14 may include dependencies that cause the execution of certain tasks 14 to block (i.e., yield control to other threads 22) and wait until the execution of one or more other tasks 14 completes before resuming and completing the execution of the blocked tasks 14. During execution, each task 14 may generate additional tasks 14 that may be added to schedulers 20. Each task 14 may also cancel other tasks 14 in schedulers 20. In adding or canceling tasks 14, an executing task 14 operates as user code 12 to interact with runtime 16 to add additional tasks 14 to one or more schedulers 20 or cancel one or more tasks 14 in one or more schedulers 20.

User code 12 executes in conjunction with runtime 16 to provide tasks 14 to one or more schedulers 20(1)-20(N). User code 12 selects particular schedulers 20(1)-20(N) for execution of tasks 14 based on properties of the tasks 14 and/or schedulers 20(1)-20(N). In one embodiment, user code 12 calls an application program interface (API) 42 in runtime 16, shown in FIG. 2, to provide the task 14 to a scheduler 20. In other embodiments, user code 12 uses other programming language constructs and/or corresponding tools provided by runtime 16 to provide a task 14 to a scheduler 20 using runtime 16. In providing each task 14, user code 12 may specify a particular scheduler 20 to runtime 16 for the task 14, allow runtime 16 to provide the task 14 to a scheduler 20 associated with user code 12, or allow runtime 16 to provide the task 14 to an ambient scheduler 20. User code 12 may also cancel or attempt to cancel tasks 14 by notifying runtime 16 and may receive notification from the runtime 16 regarding the status of cancelled tasks 14.

User code 12 may initialize schedulers 20 by invoking functions within user code 12, runtime 16, OS 18, and/or in another library or suitable programming entity (not shown) that cause schedulers 20 to be instantiated and registered with runtime 16. In some embodiments, user code may 12 may identify schedulers 20 that may be instantiated using predefined libraries or locations in the computer system and/or other information accessible by user code 12. User code 12 may also identify and use schedulers 20 that were initialized by other programming entities (e.g., user code (not shown) or other schedulers 20) using information from runtime 16 and/or information from predefined locations in the computer system.

User code 12 may be configured to operate in one or more computer systems based on any suitable execution model, such as a stack model or an interpreter model, and may represent any suitable type of code, such as an application, a library function, or an operating system service. User code 12 has a program state and machine state associated with a set of allocated resources of the computer system that include a defined memory address space. User code 12 executes autonomously or substantially autonomously from any co-existing processes in runtime environment 10. Accordingly, user code 12 does not adversely alter the program state of co-existing processes or the machine state of any resources allocated to co-existing processes. Similarly, co-existing processes do not adversely alter the program state of user code 12 or the machine state of any resources allocated to user code 12.

Runtime 16 allows tasks 14 to be executed concurrently in runtime environment 10. Runtime 16 controls all aspects of the execution of tasks 14 including task initialization, task status, task waiting, task cancellation, task continuations, and task exception handling. Runtime 16, however, allows schedulers 20 to control the implementation of task queuing, dispatch, and thread management. Runtime 16 manages the execution of tasks 14 provided by user code 12 and maintains a list 46 (shown in FIG. 2) that includes an array of references to all active instances of schedulers 20. Runtime 16 receives tasks 14 from user code 12 and initializes the tasks 14 to generate task specific state variables used to manage the status of tasks 14. Runtime 16 maintains the task specific state variables as task status 48 (shown in FIG. 2). Runtime 16 provides the tasks 14 from user code 12 to schedulers 20 specified by or associated with user code 12. Runtime 16 may provide tasks from user code 12 to an ambient scheduler 20, i.e., a default scheduler 20 invoked by runtime 16, if no scheduler 20 is specified by or associated with user code 12. Runtime 16 invokes tasks 14 for execution in response to requests from schedulers 20. In invoking tasks 14 for execution, runtime 16 maintains the status 48 of tasks 14, handles task waiting, identifies tasks 14 that may be executed inline on threads 22 as continuations, cancels tasks 14, and handles exceptions generated by tasks 14.

Figure 2:
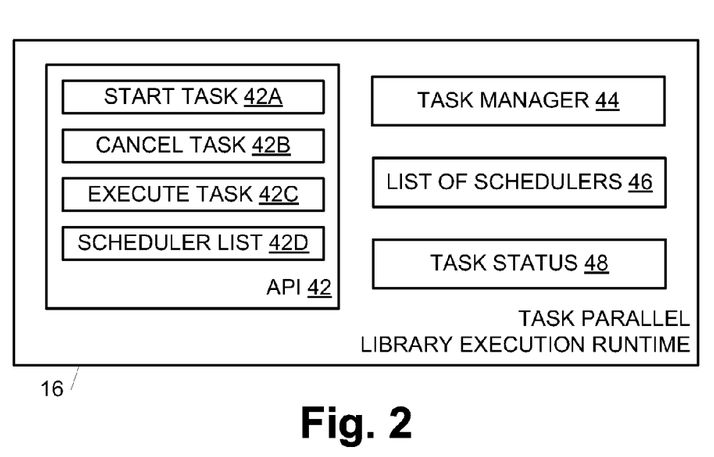
FIG. 2 is a block diagram illustrating an embodiment of a parallel execution runtime.

FIG. 2 is a block diagram illustrating an embodiment of runtime 16. In the embodiment shown in FIG. 2, runtime 16 includes API 42, a task manager 44, the list 46 of active schedulers 20, and the task status 48. API 42 includes a start task function 42A, a cancel task function 42B, an execute task function 42C, and a scheduler list function 42D. The start task function 42A allows user code 12 to queue a task 14 to a scheduler 20. The start task function 42A causes the task 14 to be provided to a scheduler 20 identified by or associated with user code 12 or to an ambient scheduler 20 if no scheduler 20 is identified or associated with user code 12. The cancel task function 42B allows user code 12 to cancel or attempt to cancel a task 14. The cancel function marks a task 14 as canceled in task status 48, notifies a scheduler 20 that a task 14 has been canceled, and may notify user code 12 regarding the status of the task cancellation. The execute task function 42C allows schedulers 20 to dispatch tasks 14 from schedulers 20 to runtime 16 for execution by threads 22 on processing cores 30. The scheduler list function 42D provides a list 46 of active schedulers 20 to debugger 24. Using the scheduler list function 42D, debugger 24 identifies schedulers 20 that may be queried to obtain task execution information.

Task manager 44 initializes tasks 14 to generate task specific state variables in task status 48, provides tasks 14 to schedulers 20, and manages the execution of tasks 14. Task manager 44 also maintains the task status 48 of tasks 14, handles task waiting, identifies tasks 14 that may be executed inline on threads 22 as continuations, notifies schedulers 20 if tasks 14 are to be canceled, and handles exceptions generated by tasks 14. For each task 14 that may be executed inline as a continuation, task manager 44 notifies the associated scheduler 20 and invokes the task 14 inline on a thread 22 only if requested by the associated scheduler 20.

Task manager 44 marks each task 14 that has been executed in task status 48. Task manager 44 prevents a task 14 that is marked as executed from being executed by another thread 22 of the scheduler 20 by checking task status 48 each time that a task 14 is invoked. By doing so, task manager 44 prevents a race condition that may occur if multiple threads 22 attempt to execute the same task 14.

OS 18 manages processing and other resources of the computer system and provides a set of functions that allow user code 12, runtime 16, schedulers 20, threads 22, debugger 24, and other processes in the computer system to access and use the components. In addition, OS 18 allocates memory from a memory system, such as a memory system 104 shown in FIG.

8 and described in additional detail below, to user code 12, runtime 16, schedulers 20, threads 22, debugger 24, and other processes in the computer system. OS 18 may allocate memory from the memory system in any suitable fixed or variable sizes.

Figure 3:
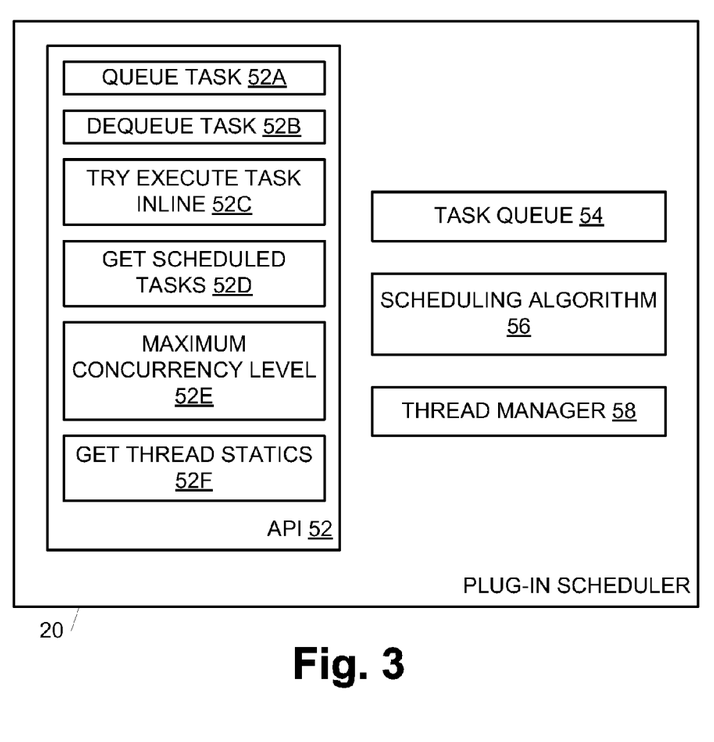
FIG. 3 is a block diagram illustrating an embodiment of a plug-in scheduler.

Each scheduler 20 is configured to schedule tasks 14 provided from user code 12 for execution by threads 22 on processing cores 30. Each scheduler 20 operates to schedule provided tasks 14 for concurrent execution using runtime 16 in any suitable way. As shown in the embodiment of FIG. 3, each scheduler 20 may include an application program interface (API) 52 for runtime 16 and debugger 24, a task queue 54, a scheduling algorithm 56, and a thread manager 58. In other embodiments, task queue 54, scheduling algorithm 56, and thread manager 58 may be omitted and a scheduler 20 may delegate these functions to other schedulers.

API 52 includes a queue task function 52A, a dequeue task function 52B, a try execute task inline function 52C, a get scheduled tasks function 52D, a maximum concurrency level function 52E, and a get thread statics function 52F. In response to user code 12 calling the start task function, runtime 16 in turn calls the queue task function 52A in the scheduler 20 designated by user code 12 to provide a task 14 to the scheduler 20. Scheduler 20 receives the task 14 and schedules the task 14 for execution (e.g., by adding the task 14 to task queue 54 or by using other suitable scheduling techniques). Runtime 16 calls the dequeue task function 52B to cancel a task 14 provided to a scheduler 20 in response to user code 12 calling the cancel task function 42B. Scheduler 20 cancels the task 14 by removing the task 14 from task queue 54 and/or by marking the task 14 as cancelled in task queue 54 to prevent scheduler 20 from dispatching the task 14 for execution.

Runtime 16 calls the try execute task inline function 52C anytime that runtime 16 determines that inline execution of a task 14 is desired. Inline execution occurs when a called task 14 is executed on a calling thread 22 that initiates a task wait on the called task 14, when the runtime 16 executes task continuations, or when user code 12 specifically requests that an unstarted task 14 be run inline from within the body of another task 14. The thread 22 either executes the called task 14 inline or otherwise waits until the called task 14 is executed by another thread 22. Inline execution may be desired in response to operations initiated by user code 12 or currently executing tasks 14. The operations may include task waits, access to certain task properties, and an explicit request from user code 12 or a task 14 for a task 14 to be executed in the current thread 22, for example.

Because execution of tasks 14 inline has functional implications for a scheduler 20 (e.g., inline execution may conflict with a design goal of a scheduler 20), runtime 16 coordinates inline execution of tasks 14 with schedulers 20 to allow schedulers 20 to determine whether or not to execute tasks 14 inline. If a scheduler 20 determines that inline execution of a task 14 is desired, then scheduler 20 calls the execute task function 42C in runtime 16 to cause the task 14 to be executed. If not, scheduler 20 returns an appropriate error code to runtime 16 so that runtime 16 may take appropriate action based on the type of inline operation. The action may include leaving the calling thread 22 blocked and executing the called task 14 on another thread 22 in response to a subsequent call of the execute task function 42C for the called task 14 by the scheduler 20.

After identifying a scheduler 20 from the scheduler list 46 provided by runtime 16, debugger 24 calls the get scheduled tasks function 52D in the identified scheduler 20 to obtain a list of tasks 14 awaiting execution in the task queue 54 of the scheduler 20. Scheduler 20 generates a list of tasks 14 awaiting execution in task queue 54 (i.e., tasks 14 in scheduler 20 that have not been executed) and provides the task list to debugger 24. Debugger 24 populates a user interface with the list of tasks 14 from the task queue 54 of the scheduler 20. Runtime 16 may receive and pre-process the get scheduled tasks function 52D call from debugger 24 in some embodiments.

Each scheduler 20 also provides a maximum concurrency level function 52E that returns a value that indicates the maximum concurrency level of the scheduler 20 (the value may denote "unlimited concurrency") and a get thread statics function 52F that returns the thread statics of the scheduler 20.

In the embodiment of FIG. 3, each scheduler 20 maintains a task queue 54 of tasks 14 and dispatches tasks 14 according to scheduling algorithm 56. Each task queue 54 forms any suitable collection of tasks 14 that are arranged in any suitable dispatch order. For example, each task queue 54 may be organized into a synchronized collection (e.g., a stack and/or a queue) for logically independent tasks 14 along with a list of workstealing queues for independent and/or dependent tasks 14. Each task queue 54 may be customized for each scheduler 20 such that each type of scheduler 20 includes a different task queue 54. Multiple schedulers 20 or multiple instances of the same scheduler 20, however, may include the same type of task queue 54 at any given time.

In the embodiment of FIG. 3, each scheduling algorithm 56 may be any suitable type of dispatch loop that dispatches tasks 14 from the corresponding task queue 54 for execution in an order determined by any suitable criteria. Each scheduling algorithm 56 may also be customized for each scheduler 20 such that each type of scheduler 20 includes a different scheduling algorithm 56. Multiple schedulers 20 or multiple instances of the same scheduler 20, however, may include the same type of scheduling algorithm 56 at any given time.

Each scheduler 20 in the embodiment of FIG. 3 also includes a thread manager 58. Thread manager 58 obtains access to threads 22 in any suitable way such as by requesting threads 22 from OS 18 and/or runtime 16 or by delegating thread management to another execution entity such as another scheduler 20 or other user code (not shown). Each thread 22 forms a thread, fibre (i.e., a lightweight thread), or analogous OS concept such as a child process that executes associated tasks 14 and other instructions on processing cores 30. Each thread 22 includes program state and machine state information. Thread manager 58 may be any suitable type of thread manager that manages threads 22 in any suitable way. Each thread manager 58 may also be customized for each scheduler 20 such that each type of scheduler 20 includes a different thread manager 58. Multiple schedulers 20 or multiple instances of the same scheduler 20, however, may include the same type of thread manager 58 at any given time.

When a thread 22 is available to a scheduler 20, scheduler 20 selects a task 14 and provides the task 14 to runtime 16 for execution by the thread 22. The thread 22 executes the task 14 to completion, a blocking point, or other interruption (e.g., an explicit yield or a forced preemption). Upon completion of a task 14 on a thread 22, the thread 22 becomes available to execute another task 14 from scheduler 20. A task 14 executing on a thread 22 may unblock other tasks 14 previously dispatched for execution by the scheduler 20 by generating data, a message, or an event, for example, which will be used by a blocked task 14. Scheduler 20 continues providing tasks 14 to runtime 16 for execution by threads 22 until all tasks 14 of the scheduler 20 have been executed.

Debugger 24 is configured to access and provide information regarding the execution of tasks 14 by schedulers 20 during the execution of user code 12 to one or more users. When debugger 24 encounters a breakpoint in the execution of user code 12, debugger 24 calls the scheduler list function 42D in runtime 16 to obtain the list 46 of active schedulers 20 registered by runtime 16. For each instance of schedulers 20 in list 46, debugger 24 calls the get scheduled tasks function 52D to receive a list of tasks 14 awaiting execution in tasks queues 54 of each instance of schedulers 20. Debugger 24 uses the information contained in the lists of tasks 14 to output information regarding the execution of tasks 14 by schedulers 20 to any suitable user interface such as a display device and/or a file.

Processing cores 30 reside in a set or one or more processor packages (e.g., processor packages 102 shown in FIG. 8 and described in additional detail below) of the computer system. Each processing core 30 is configured to execute instructions independently or substantially independently from the other processing cores 30 and includes a machine state. Processing cores 30 may be included in a single processor package or may be distributed across multiple processor packages.

Figure 4A:
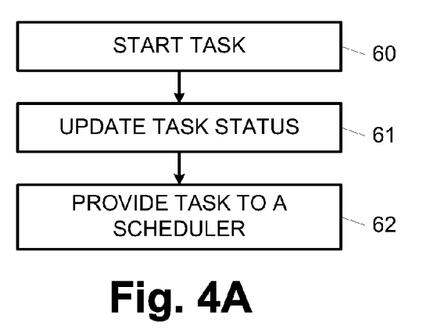
FIGS. 4A-4B are flow charts illustrating embodiments of methods for providing a task from user code to a scheduler.

The process of providing a task 14 from user code 12 to a scheduler 20 will now be described with reference to FIGS. 1-4B. FIG. 4A is a flowchart illustrating an embodiment of a method performed by runtime 16, and FIG. 4B is a flowchart illustrating an embodiment of a method performed by a scheduler 20.

In FIG. 4A, anytime that runtime 16 determines that the start task function 42A has been invoked by user code 12 as indicated in a block 60, runtime updates the task status 48 of the task 14 as indicated in a block 61 and provides the task 14 to a scheduler 20 specified by or associated with user code 12 as indicated in a block 62. Runtime 16 provides the task 14 to the specified scheduler 20 by invoking the queue task function 52A in the scheduler 20. Runtime 16 may provide the task 14 to an ambient scheduler 20 by invoking the queue task function 52A in the ambient scheduler 20 if no scheduler 20 is specified by or associated with user code 12.

Figure 4B:
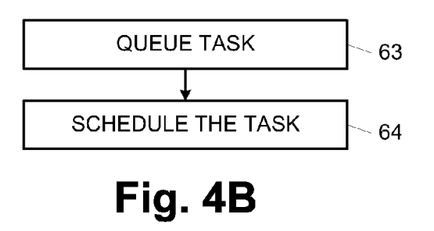

In FIG. 4B, anytime that a scheduler 20 determines that the queue task function 52A has been invoked by runtime 16 as indicated in a block 63, the scheduler 20 receives the task 14 associated with the invocation and takes appropriate action to schedule the task 14, which in some embodiments involves adding the task 14 to a task queue 54 to be scheduled for execution, as indicated in a block 64. As described above, scheduler 20 operates task queue 54 to form any suitable collection of tasks 14 that are arranged in any suitable dispatch order.

Figure 5A:
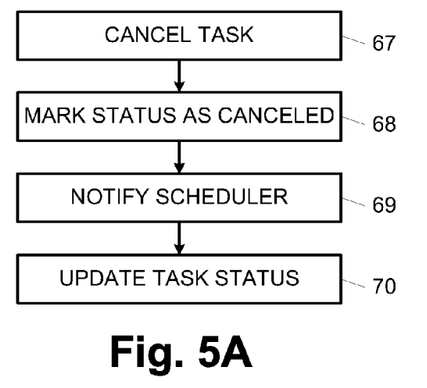
FIGS. 5A-5B are flow charts illustrating embodiments of methods for canceling a task provided from user code to a scheduler.

The process of canceling a task 14 provided from user code 12 to a scheduler 20 will now be described with reference to FIGS. 1-3 and 5A-5B. FIG. 5A is a flowchart illustrating an embodiment of a method performed by runtime 16, and FIG. 5B is a flowchart illustrating an embodiment of a method performed by a scheduler 20.

In FIG. 5A, anytime that runtime 16 determines that the cancel task function 42B has been invoked by user code 12 as indicated in a block 67, runtime 16 marks the task 14 as canceled in task status 48 as indicated in a block 68 and notifies the corresponding scheduler 20 that the task 14 has been canceled as indicated in a block 69. Runtime 16 notifies the scheduler 20 that the task 14 has been canceled by invoking the dequeue task function 52B in the scheduler 20. Runtime 16 updates the task status 48 of the task 14 in response to information received back from the scheduler 20 as indicated in a block 70 and may also notify user code 12 regarding the status of the task cancellation as part of the process of updating the task status 48 of the task 14.

Figure 5B:
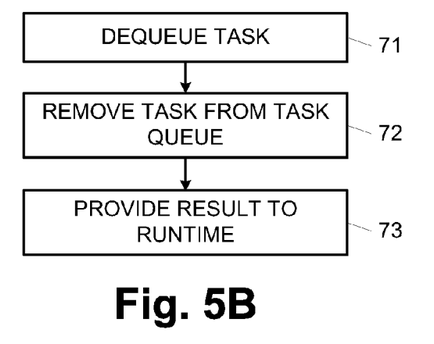

In FIG. 5B, anytime that a scheduler 20 determines that the dequeue task function 52B has been invoked by runtime 16 as indicated in a block 71, the scheduler 20 removes the task 14 from the task queue 54, if present, as indicated in a block 72 to prevent the task 14 from being executed. Scheduler 20 removes the task 14 by removing the task 14 from task queue 54 (if present) and/or by marking the task 14 as cancelled to prevent the task 14 from being dispatched for execution. Scheduler 20 provides a result of the dequeue task function 52B to runtime 16 that indicates the success or failure of dequeuing the task 14 as indicated in a block 73.

Figure 6A:
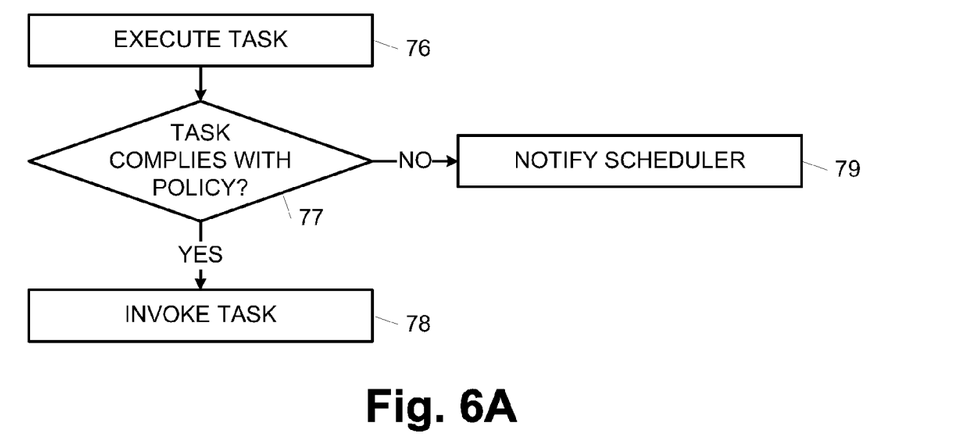
FIGS. 6A-6B are flow charts illustrating embodiments of methods for invoking a task in a task queue of a scheduler 20 for execution.

The process of invoking a task 14 from a task queue 54 of a scheduler 20 for execution will now be described with reference to FIGS. 1-3 and 6A-6B. FIG. 6A is a flowchart illustrating an embodiment of a method performed by runtime 16, and FIG. 6B is a flowchart illustrating an embodiment of a method performed by a scheduler 20.

In FIG. 6A, anytime that runtime 16 determines that the execute task function 42C has been called by a scheduler 20 as indicated in a block 76, runtime 16 determines whether the task 14 complies with the policies of runtime 16 as indicated in a block 77. If the task 14 complies with the policies of runtime 16, then runtime 16 invokes the task 14 to cause the task 14 to be executed by a thread 22 on a processing core 30 as indicated in a block 78. If the task 14 does not comply with the policies of runtime 16, then runtime 16 notifies scheduler 20 by invoking an exception as indicated in a block 79.

Figure 6B:
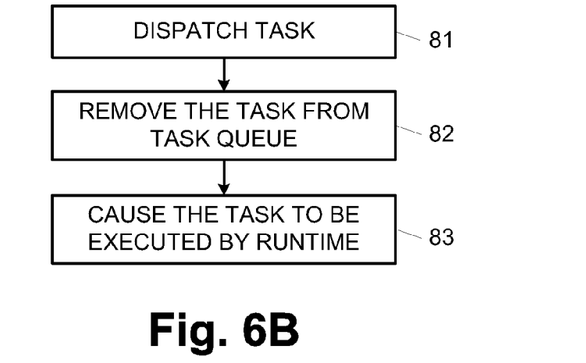

In the embodiment shown in FIG. 6B, anytime that a scheduler 20 decides to dispatch a task 14 (e.g., in response to a thread 22 becoming available) as indicated in a block 81, the scheduler 20 removes the task 14 from the task queue 54 as indicated in a block 82 and causes the task 14 to be executed by runtime 16 as indicated in a block 83. Scheduler 20 dispatches the task 14 for execution by calling the execute task function 42C of runtime 16. Scheduler 20 may handle any exceptions generated by runtime 16 where a task 14 does not comply with the policies of runtime 16.

Figure 7A:
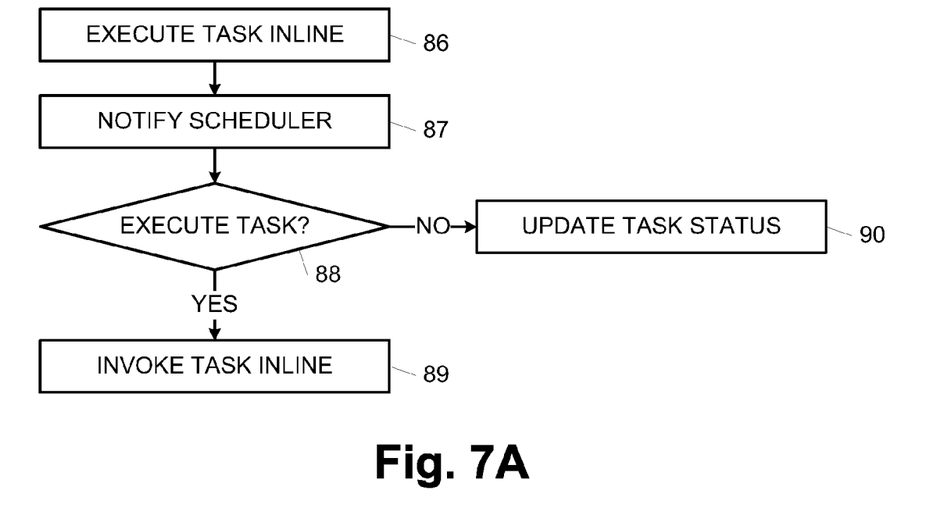
FIGS. 7A-7B are flow charts illustrating embodiments of methods for invoking a task for inline execution.

The process of invoking a task 14 for inline execution will now be described with reference to FIGS. 1-3 and 7A-7B. FIG. 7A is a flowchart illustrating an embodiment of a method performed by runtime 16, and FIG. 7B is a flowchart illustrating an embodiment of a method performed by a scheduler 20.

In FIG. 7A, anytime that runtime 16 determines that inline execution of a task 14 (i.e., execution of a task 14 on the caller thread 22) is desired as indicated in a block 86, runtime 16 notifies the scheduler 20 that dispatched the task 14 that was executing on the caller thread 22 as indicated in a block 87. Runtime 16 notifies scheduler 20 by calling the try execute task inline function 52C of the scheduler 20. Depending on how the scheduler 20 responds to the try execute task inline function 52C, runtime 20 either invokes the task 14 inline as indicated in a block 89 or takes appropriate action without invoking the task 14 inline as indicated in a block 90.

Figure 7B:
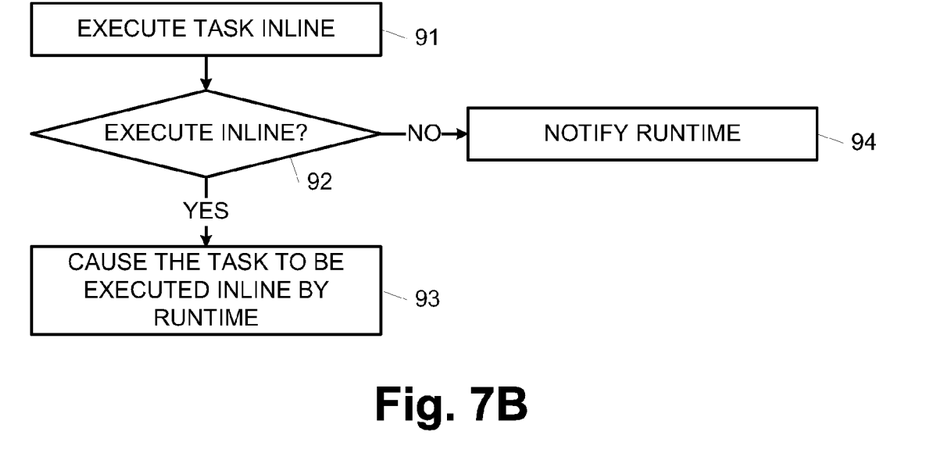

In FIG. 7B, anytime that a scheduler 20 determines that runtime 16 seeks to execute a task 14 inline as indicated in a block 91, the scheduler 20 determines whether inline execution of a task 14 is desired as indicated in a block 92. If the scheduler 20 determines that inline execution of the task 14 is desired, then the scheduler 20 causes the task 14 to be executed inline by calling the execute task function 42C in runtime 16 as indicated in a block 93. The scheduler 20 may determine whether inline execution of a task 14 is desired in any suitable way. The determination may be based on the configuration of task queue 54, scheduling algorithm 56, thread manager 58, and/or other suitable criteria. If the scheduler 20 determines that inline execution of a task 14 is not desired, then scheduler 20 notifies runtime 16 by returning an error code or other suitable information as indicated in a block 94.

Figure 8:
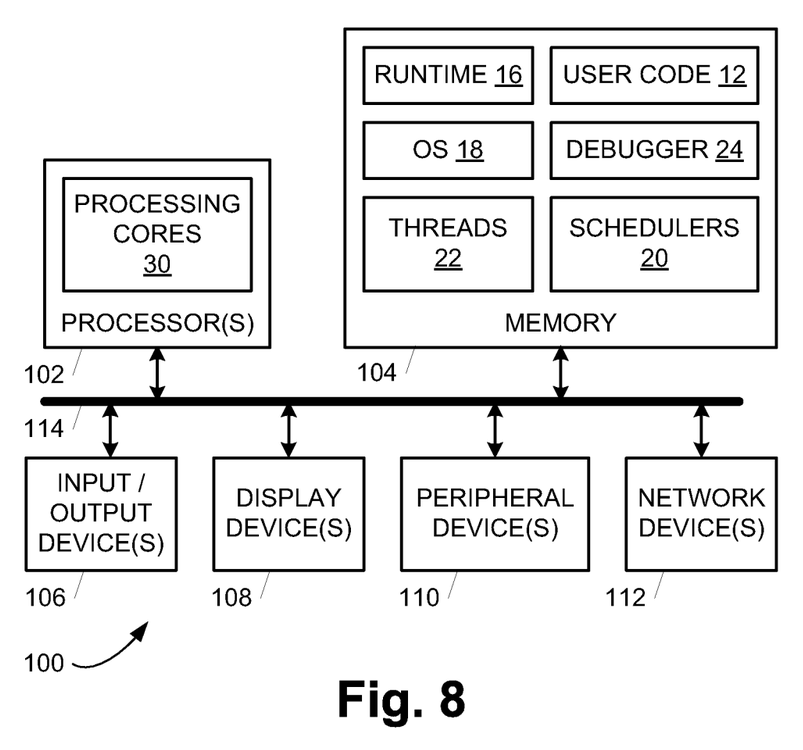
FIG. 8 is a block diagram illustrating an embodiment of a computer system configured to implement a runtime environment with a parallel execution runtime and a set of plug-in schedulers.

FIG. 8 is a block diagram illustrating an embodiment of computer system 100 which is configured to implement runtime environment 10 with runtime 16 and plug-in schedulers 20 as described above.

Computer system 100 includes one or more processor packages 102 that each include one or more processing cores 30, memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone or smartphone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 each include one or more processing cores 30 that form execution hardware configured to execute instructions (i.e., software). Each processor package 102 may include processing cores 30 with the same or different architectures and/or instruction sets. For example, the processing cores 30 may include any combination of in-order execution cores, superscalar execution cores, and GPGPU execution cores. Each processing core 30 in processor packages 102 is configured to access and execute instructions stored in memory system 104. The instructions may include a basic input output system (BIOS) or firmware (not shown), user code 12, runtime 16, OS 18, schedulers 20, threads 22, and debugger 24. Each processing core 30 may execute the instructions in conjunction with or in response to information received from input/output devices 106, display devices 108, peripheral devices 110, and/or network devices 112.

Memory system 104 includes any suitable type, number, and configuration of volatile or non-volatile storage devices configured to store instructions and data. The storage devices of memory system 104 represent computer-readable storage media that store computer-executable instructions (i.e., software) including user code 12, runtime 16, OS 18, schedulers 20, threads 22, and debugger 24. Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112. The instructions are executable by computer system 100 to perform the functions and methods of user code 12, runtime 16, OS 18, schedulers 20, threads 22, and debugger 24 described herein. Examples of storage devices in memory system 104 include hard disk drives, random access memory (RAM), read only memory (ROM), flash memory drives and cards, and magnetic and optical disks such as CDs and DVDs.

Computer system 100 boots and executes OS 18. OS 18 includes instructions executable by processor packages 102 to manage the components of computer system 100 and provide a set of functions that allow user code 12, runtime 16, OS 18, schedulers 20, threads 22, and debugger 24 to access and use the components. In one embodiment, OS 18 is the Windows operating system. In other embodiments, OS 18 is another operating system suitable for use with computer system 100. Runtime 16 includes instructions that are executable in conjunction with OS 18 to generate runtime environment 10 shown in FIG. 1 and provide runtime functions to user code 12, schedulers 20, and debugger 24. The runtime functions may be included as an integrated part of OS 18 or other programming entities and/or constructs in other embodiments.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer-readable storage medium, which does not include transitory propagating signals, storing computer-executable instructions that, when executed by at least one computer system, perform a method comprising:

initializing a first task from user code for execution with a parallel execution runtime configured to allow the first task to be executed concurrently with a set of other tasks from the user code in a runtime environment;

maintaining a task status corresponding to the first task with the parallel execution runtime;

providing the first task to a first plug-in scheduler specified by the user code with the parallel execution runtime, the parallel execution runtime maintaining a list of active schedulers that includes the first plug-in scheduler; and invoking the first task with the parallel execution runtime responsive to the first plug-in scheduler.

2. The computer-readable storage medium of claim 1, further comprising:
  updating the task status with the parallel execution runtime subsequent to initializing the first task and prior to the first task completing execution.

3. The computer-readable storage medium of claim 1, further comprising:
  calling a queue task function in the first plug-in scheduler with the parallel execution runtime to provide the first task to the first plug-in scheduler.

4. The computer-readable storage medium of claim 3, further comprising:
  receiving an invocation of an execute task function from the first plug-in scheduler with the parallel execution runtime; and
  invoking the first task with the parallel execution runtime responsive to receiving the invocation of the execute task function.

5. The computer-readable storage medium of claim 4, further comprising:
  selecting the first task for execution in the first plug-in scheduler; and
  invoking the execute task function of the parallel execution runtime with the first plug-in scheduler to cause the first task to be executed.

6. The computer-readable storage medium of claim 1, the method further comprising:
  registering the first plug-in scheduler into the list of active schedulers with the parallel execution runtime in response to the first plug-in scheduler being instantiated.

7. The computer-readable storage medium of claim 1, the method further comprising:
  determining that inline execution of a second task is desired with the parallel execution runtime;
  notifying the first plug-in scheduler that the inline execution of the second task is desired with the parallel execution runtime; and
  invoking the second task inline with the parallel execution runtime responsive to the first plug-in scheduler.

8. The computer-readable storage medium of claim 1, the method further comprising:
  providing the list of active schedulers from the parallel execution runtime to a debugger.

9. The computer-readable storage medium of claim 1, the method further comprising:
  providing a list of tasks awaiting execution from the first plug-in scheduler to a debugger.

10. The computer-readable storage medium of claim 1, the method further comprising:
  initializing a second task from the user code for execution with the parallel execution runtime;
  providing the second task to a second scheduler specified by the user code, the first plug-in scheduler including a first scheduling algorithm that differs from a second scheduling algorithm included in the second scheduler; and
  invoking the second task responsive to the second scheduler.

11. A computer-readable storage medium, which does not include transitory propagating signals, storing computer-executable instructions that, when executed on at least one computer system, perform a method comprising:
  calling a start task function in a parallel execution runtime from user code to cause a first task to be provided to a first plug-in scheduler, the parallel execution runtime configured to allow the first task to be executed concurrently with a set of other tasks from the user code in a runtime environment, the parallel execution runtime configured to maintain a task status corresponding to the first task;
  calling a queue task function in a first plug-in scheduler from the parallel execution runtime to provide the first task to a first plug-in scheduler specified by the user code, the parallel execution runtime maintaining a list of active schedulers that includes the first plug-in scheduler; and
  calling an execute task function in the parallel execution runtime from the first plug-in scheduler to cause the first task to be invoked for execution.

12. The computer-readable storage medium of claim 11, the method further comprising:
  providing a cancel task request from the user code to the parallel execution runtime to request that the first task be canceled prior to execution;
  calling a dequeue task function in the first plug-in scheduler from the parallel execution runtime to remove the first task from the first plug-in scheduler; and
  returning information from the first plug-in scheduler to the parallel execution runtime that indicates whether the first task was canceled.

13. The computer-readable storage medium of claim 11, the method further comprising:
  invoking the first task from the parallel execution runtime in response to the first task complying with a policy of the parallel execution runtime.

14. The computer-readable storage medium of claim 11, the method further comprising:
  calling a try execute inline function in the first plug-in scheduler from the parallel execution runtime in response to the parallel execution runtime determining that inline execution of a second task is desired; and
  calling the execute task function in the parallel execution runtime from the first plug-in scheduler to cause the second task to be invoked for inline execution.

15. The computer-readable storage medium of claim 11, the method further comprising:
  calling a scheduler list function in the parallel execution runtime from a debugger to obtain the list of active schedulers from the parallel execution runtime; and
  calling a get scheduled tasks function in the first plug-in scheduler from the debugger to obtain a list of tasks awaiting execution in the first plug-in scheduler.

16. A method performed by at least one computer system, the method comprising:
  initializing a first task from user code for execution with a parallel execution runtime configured to allow the first task to be executed concurrently with a set of other tasks from the user code in a runtime environment;
  maintaining a task status corresponding to the first task with the parallel execution runtime;
  providing the first task from the parallel execution runtime to a first plug-in scheduler specified by the user code, the parallel execution runtime maintaining a list of active schedulers that includes the first plug-in scheduler with a first scheduling algorithm and a second scheduler with a second scheduling algorithm that differs from the first scheduling algorithm;
  dispatching the first task from the first plug-in scheduler to the parallel execution runtime according to first scheduling algorithm of the first plug-in scheduler; and
  invoking the first task with the parallel execution runtime responsive to the first plug-in scheduler dispatching the first task.

17. The method of claim 16 further comprising:
providing a cancel request corresponding to the first task from the user code to the parallel execution runtime;
providing a dequeue request from the parallel execution runtime to the first plug-in scheduler; and
removing the first task from the first plug-in scheduler responsive to the dequeue request from the parallel execution runtime.

18. The method of claim 17 further comprising:
determining that inline execution of a second task is desired with the parallel execution runtime;
notifying the first plug-in scheduler that the inline execution of the second task is desired; and
invoking the second task inline responsive to the first plug-in scheduler.

19. The method of claim 18 further comprising:
providing the list of active schedulers to a debugger; and
providing a list of tasks awaiting execution in the first plug-in scheduler to the debugger.

\* \* \* \* \*